US010882388B2

(12) United States Patent
Ohnemus et al.

(10) Patent No.: US 10,882,388 B2
(45) Date of Patent: Jan. 5, 2021

(54) INTERNAL COMBUSTION ENGINE DECOUPLING DEVICE OF A PHEV TRANSMISSION UNIT

(71) Applicant: Bayerische Motoren Werke Aktiengesellschaft, Munich (DE)

(72) Inventors: Ulrich Ohnemus, Hattenhofen (DE); Michael Etzel, Munich (DE); Roland Gollmer, Diessen (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 273 days.

(21) Appl. No.: 15/967,656

(22) Filed: May 1, 2018

(65) Prior Publication Data

US 2018/0244145 A1    Aug. 30, 2018

Related U.S. Application Data

(63) Continuation of application No. PCT/EP2016/075244, filed on Oct. 20, 2016.

(30) Foreign Application Priority Data

Nov. 2, 2015 (DE) .................. 10 2015 221 368

(51) Int. Cl.
*B60K 6/48* (2007.10)
*B60K 6/20* (2007.10)
(Continued)

(52) U.S. Cl.
CPC ............. *B60K 6/48* (2013.01); *B60K 6/365* (2013.01); *B60K 6/387* (2013.01); *B60K 6/40* (2013.01);
(Continued)

(58) Field of Classification Search
CPC ... B60K 6/48; B60K 6/20; B60K 6/22; B60K 6/365; B60K 6/387; B60K 6/40;
(Continued)

(56) References Cited

U.S. PATENT DOCUMENTS 3,099,421 A * 7/1963 Gerstine .............. G05D 1/0858
244/17.13
5,517,876 A * 5/1996 Genise ................. F16H 63/304
74/473.24
(Continued)

FOREIGN PATENT DOCUMENTS

CN   1729114 A   2/2006
CN   1793703 A   6/2006
(Continued)

OTHER PUBLICATIONS

German-language Office Action issued in counterpart Chinese Application No. 10 2015 221 368.4 dated Jun. 22, 2016 (Six (6) pages).
(Continued)

*Primary Examiner* — Tinh Dang
(74) *Attorney, Agent, or Firm* — Crowell & Moring LLP

(57) ABSTRACT

A drive machine coupling device for a motor vehicle with a hybrid drive is provided. The device includes an input shaft designed to receive the drive power provided by a first drive machine, an output shaft designed to output the drive power, and a first coupling device arranged between the input shaft and the output shaft. By way of the first coupling device, a torque can selectively be transmitted from the input shaft to the output shaft. The coupling device can be directly coupled to the output shaft. An additional coupling device is arranged between the input shaft and the output shaft, and can be directly coupled to the output shaft, such that a torque can selectively be transmitted from the input shaft to the output shaft. The additional coupling device is arranged parallel to
(Continued)

the first coupling device with respect to the torque transmission.

16 Claims, 2 Drawing Sheets

(51) Int. Cl.
| | |
|---|---|
| *B60K 6/22* | (2007.10) |
| *B60K 6/365* | (2007.10) |
| *B60K 6/387* | (2007.10) |
| *B60K 6/40* | (2007.10) |
| *F16D 11/14* | (2006.01) |
| *F16D 13/52* | (2006.01) |
| *F16D 21/06* | (2006.01) |
| *F16D 25/10* | (2006.01) |
| *F16D 3/12* | (2006.01) |
| *F16F 15/30* | (2006.01) |

(52) U.S. Cl.
CPC ............. *F16D 11/14* (2013.01); *F16D 13/52* (2013.01); *F16D 21/06* (2013.01); *F16D 25/10* (2013.01); *B60K 2006/4816* (2013.01); *B60Y 2200/92* (2013.01); *F16D 3/12* (2013.01); *F16D 2021/0661* (2013.01); *F16D 2300/22* (2013.01); *F16D 2500/1066* (2013.01); *F16F 15/30* (2013.01); *Y10S 903/902* (2013.01)

(58) Field of Classification Search
CPC .......... F16D 11/14; F16D 13/52; F16D 21/06; F16D 25/10; F16D 3/12; F16D 2021/0661; F16D 2500/1066; F16D 2300/22

See application file for complete search history.

(56) References Cited

U.S. PATENT DOCUMENTS

| | | | | |
|---|---|---|---|---|
| 8,684,875 | B2* | 4/2014 | Kaltenbach | B60W 10/113 475/5 |
| 8,702,546 | B2* | 4/2014 | Kaltenbach | B60K 6/387 475/5 |
| 8,747,279 | B2* | 6/2014 | Furuichi | F16D 25/044 477/5 |
| 9,381,906 | B2* | 7/2016 | Isomura | B60K 6/547 |
| 9,409,473 | B2* | 8/2016 | Kaltenbach | F16H 3/126 |
| 9,463,687 | B2* | 10/2016 | Kaltenbach | F16H 3/725 |
| 9,746,051 | B2* | 8/2017 | Murata | B60W 10/02 |
| 10,071,622 | B2* | 9/2018 | Kaltenbach | B60W 20/40 |
| 10,507,717 | B2* | 12/2019 | Iwashita | B60W 10/08 |
| 10,767,712 | B2* | 9/2020 | Maessen | F16D 48/066 |
| 2005/0230172 | A1 | 10/2005 | Hopper | |
| 2006/0142106 | A1 | 6/2006 | Dourra et al. | |
| 2008/0000746 | A1* | 1/2008 | Schiele | B60K 6/547 192/3.54 |
| 2010/0273603 | A1 | 10/2010 | Roses et al. | |
| 2010/0273606 | A1 | 10/2010 | Roses et al. | |
| 2011/0224043 | A1 | 9/2011 | Bachmann et al. | |
| 2012/0234641 | A1 | 9/2012 | Petzold et al. | |
| 2013/0079193 | A1 | 3/2013 | Ohnemus et al. | |
| 2013/0109524 | A1* | 5/2013 | Kaltenbach | B60K 6/387 475/5 |
| 2014/0373675 | A1* | 12/2014 | Kaltenbach | B60K 6/547 74/661 |
| 2017/0036529 | A1 | 2/2017 | Ohnemus et al. | |

FOREIGN PATENT DOCUMENTS

| | | |
|---|---|---|
| CN | 102781699 A | 11/2012 |
| CN | 203358323 U | 12/2013 |
| DE | 10 2008 043 290 A1 | 5/2010 |
| DE | 10 2009 047 766 A1 | 6/2011 |
| DE | 10 2010 051 911 U | 6/2011 |
| DE | 10 2011 085 201 A1 | 5/2013 |
| DE | 10 2013 006 429 A1 | 10/2014 |
| DE | 10 2014 207 884 A1 | 10/2015 |

OTHER PUBLICATIONS

International Search Report (PCT/ISA/210) issued in PCT Application No. PCT/EP2016/075244 dated Jan. 5, 2017 with English-language translation (Five (5) pages).

German-language Written Opinion (PCT/ISA/237) issued in PCT Application No. PCT/EP2016/075244 dated Jan. 5, 2017 (Five (5) pages).

Chinese-language Office Action issued in counterpart Chinese Application No. 201680042217.6 dated Nov. 28, 2018 with English translation (15 pages).

* cited by examiner

INTERNAL COMBUSTION ENGINE DECOUPLING DEVICE OF A PHEV TRANSMISSION UNIT

CROSS REFERENCE TO RELATED APPLICATIONS

This application is a continuation of PCT International Application No. PCT/EP2016/075244, filed Oct. 20, 2016, which claims priority under 35 U.S.C. § 119 from German Patent Application No. 10 2015 221 368.4, filed Nov. 2, 2015, the entire disclosures of which are herein expressly incorporated by reference.

BACKGROUND AND SUMMARY OF THE INVENTION

The invention relates to a drive machine coupling apparatus. Coupling apparatuses of said type are known from the prior art, and in particular from DE 10 2008 043 290 A1.

The invention will be discussed below in conjunction with a passenger motor vehicle and the hybrid drivetrain thereof having an internal combustion engine and an electric drive machine. However, this is not to be understood as a limitation of the invention to such an application.

Drivetrains of said type have a separating clutch for the coupling/decoupling of the internal combustion engine to/from the rest of the drivetrain. Here, high levels of drive power that can be provided by the internal combustion engine have the effect that said separating clutch must be dimensioned or designed correspondingly. Owing to the relatively high transmissible torque, wet-running separating clutches and/or separating clutches with a large number of friction pads are commonly provided. Such separating clutches are generally not only expensive, but also have a not inconsiderable structural space requirement.

DE 10 2008 043 290 A1 proposes, for a hybrid system, a coupling apparatus in which a planetary gear set (internal gear, sun gear, planet gears and planet carrier) is arranged radially within the rotor of an electric drive machine. Furthermore, the internal combustion engine is connectable by way of a frictionally locking clutch with a multiplicity of friction pads to the output shaft of said apparatus such that the entire power that can be provided by the internal combustion engine is transmissible in a frictionally locking fashion from an input shaft of the coupling apparatus to an output shaft.

It is an object of the invention to specify a drive machine coupling apparatus which permits a compact construction. Said object is achieved by way of a drive machine coupling apparatus, and by way of a drivetrain having an apparatus of said type, in accordance with embodiments of the invention.

The proposed drive machine coupling apparatus has, similarly to known dual-clutch transmissions, two coupling apparatuses which are arranged preferably concentrically with respect to one another.

As in the case of known dual-clutch transmissions, said drive machine coupling apparatus duly also has a first and a further coupling device which are directly connected to an input shaft. By contrast to the drive machine coupling apparatus, however, in the case of dual-clutch transmissions, the drive power is transmitted by the two coupling apparatuses to a first and a second output shaft, which in that case are formed as transmission shafts, and not to a common output shaft.

In the context of the invention, a drive machine coupling apparatus is thus to be understood to mean an apparatus by way of which a drive machine, in particular an internal combustion engine of reciprocating-piston type of construction, is selectively connectable to further components of a drivetrain in a motor vehicle with hybrid drive for the purposes of power transmission, that is to say in particular for the transmission of a rotational speed and a torque.

For this purpose, the drive machine coupling apparatus preferably has an input shaft and an output shaft. In a torque transmission direction, a first coupling device is arranged between said two shafts. Said first coupling device is designed in particular for the selective connection of the input shaft to the output shaft. For this purpose, said coupling device is preferably directly connectable or connected to the input shaft and to the output shaft.

In the context of the invention, "directly connectable or connected" is to be understood to mean that a coupling device is directly connected to the respective shaft, that is to say in particular without the drive power being transmitted by way of gear wheels, friction wheels or attraction mechanisms from the input shaft to the coupling mechanism connected thereto or from the coupling device to the output shaft connected thereto. It is furthermore preferable for the input shaft and/or the output shaft to be in each case rotationally conjointly connected to the coupling device.

According to the invention, in relation to the torque transmission from the input shaft to the output shaft, a further coupling device is arranged between said shafts. Said further coupling device is preferably also directly coupled to the output shaft and to the input shaft. It is furthermore preferable for the input shaft to be formed as a subregion of the first coupling device, and further preferably connectable integrally to said first coupling device. It is furthermore preferable for the input shaft to be connectable in a positively locking, preferably non-positively locking and particularly preferably integral fashion to the first coupling device.

Said further coupling device is preferably designed to selectively interrupt the torque transmission between the input shaft and the output shaft, and therefore, by way of said further coupling device, torque can be selectively transmitted from the input shaft to the output shaft, in particular independently of the first coupling device. Here, said further coupling device is, in relation to the torque transmission from the input shaft to the output shaft, arranged in parallel with respect to the first coupling device.

In the context of the invention, said parallel arrangement of the coupling devices means that torque can be transmitted from the input shaft both to the first coupling device and to the further coupling device, and from each of the coupling devices to the output shaft, in each case independently of the other coupling device.

In particular, each of said coupling devices has an open state, in which no torque can be transmitted by way of the respective coupling device, and a closed state, in which a torque can be transmitted. In particular, by way of the parallel arrangement of the two coupling devices, it is thus made possible for a torque to be transmitted from the input shaft to the output shaft as soon as only one of said coupling devices has been transferred into its closed state. Furthermore, the torque transmission capacity, that is to say the maximum transmissible torque of the drive decoupling apparatus, can be increased by way of the transfer of the other coupling device from the open state into the closed state, such that both coupling devices are in their closed state.

In a preferred embodiment, the first coupling device is formed as a frictionally locking, in particular dry-running, single-disk or multi-disk friction clutch, and preferably as dry-running multiplate clutch. Such a friction clutch preferably has at least one first and one second friction surface, which are preferably formed as friction plates, and it is furthermore preferable for the friction clutch to have a multiplicity of friction surfaces or friction plates.

In particular, a dry-running friction clutch offers the advantage that it has a lower drag torque than a wet-running friction clutch, and thus greater efficiency. It is furthermore preferably possible for the actuation of a dry-running friction clutch to be performed by way of a central disengagement mechanism and a disengagement bearing, without further drag-torque-inducing rotary leadthroughs.

The number of friction plates/friction surfaces of said multiplate clutch/friction clutch is preferably less than 10, preferably less than 5 and particularly preferably less than or equal to 3. Said multiplate clutch/friction clutch is preferably formed as a dry-running multiplate clutch. By contrast to a conventional multiplate clutch, which in motor vehicles is commonly equipped as a wet-running multiplate clutch and/or as a multiplate clutch with a large number of friction plates, it is made possible according to the invention for the first coupling device to be designed as a dry-running multiplate clutch with a small number of friction plates, because a part of the transmissible torque can be transmitted by way of the further coupling device connected in parallel. Said part of the torque that can be transmitted by way of the further coupling device is preferably 50% or more of the total torque, preferably 66% or more and preferably 75% or more.

The first coupling device is preferably designed at least substantially for cranking an internal combustion engine (first drive machine) during a starting process of the internal combustion engine. For starting the internal combustion engine, the latter must in particular be accelerated from a standstill to a starting rotational speed, above which fired operation is possible. For such starting processes, a torque required is in particular lower than that which can be output by the first drive machine, and preferably, the first clutch device is designed for said low torque that is required for starting the internal combustion engine. The first coupling device is thus preferably designed for producing a torque-transmitting connection from the output side of the coupling device to the input side thereof, and thus permitting a so-called cranked start of the internal combustion engine. In particular, the first coupling device is not used for permitting launch processes with the first drive machine, and it is thus made possible for said first coupling device to be designed with particularly space-saving dimensions.

In a preferred embodiment, the further coupling device is formed as a positively locking coupling device. Correspondingly to the first coupling device, which is preferably dimensioned for the starting of the first drive machine, the further coupling device is designed for transmitting the "remaining" torque. In the context of the invention, a positively locking coupling device is preferably to be understood to mean a dog clutch, a clutch with a sliding sleeve for selective torque transmission, or generally a coupling device in which the torque can be transmitted selectively by way of a positively locking connection. By way of a positively locking coupling device in particular, it is made possible for high torque to be transmitted in a small structural space. Here, said further coupling device is arranged such that, with the latter, torque can be selectively transmitted from the input shaft to the output shaft by way of said positively locking connection.

In a preferred embodiment, the output shaft of the drive machine coupling apparatus is couplable or coupled to a further drive machine. Said further drive machine is preferably formed as an electromechanical energy converter, preferably as an electric motor/generator, preferably as an electric motor. Said further drive machine furthermore preferably has, for transmitting drive power to the output shaft, a rotor which is couplable, at least indirectly, to the output shaft, and with a stator. Here, in the context of the invention, the indirect coupling of the rotor to the output shaft is to be understood in particular to mean that a gear set device is arranged in the torque transmission direction from the rotor to said output shaft. Said gear set device is preferably formed as a planetary gear set. In particular, by way of such an embodiment, it is made possible for a particularly high torque to be transmitted to the output shaft by way of the further drive machine.

In a preferred embodiment, the gear set device that is designed for transmitting drive power from the further drive machine to the output shaft has a transmission ratio which is greater than 1, preferably greater than 1.25, and particularly preferably greater than 1.5, and said transmission ratio is furthermore preferably less than 2.5, preferably less than 2 and particularly preferably less than 1.7. In a further preferred embodiment, said transmission ratio is at least substantially 1.6. By way of such a transmission ratio in particular, it is made possible to realize a step-down transmission ratio of the rotational speed of the rotor in relation to the rotational speed of the output shaft, and thus an increase of the torque at the output shaft.

In a preferred embodiment, the gear set device which, in the torque transmission direction from the further drive machine to the output shaft, is arranged between these is formed as a planetary gear set. Said planetary gear set preferably has a planet gear carrier which is couplable to the output shaft. It is preferable for at least one planet gear, preferably 2, preferably 3 or particularly preferably 4 or more planet gears, to be rotatably mounted on said planet gear carrier. An internal gear or a sun gear of the planetary gear set, or both, can be placed in contact with planet gear or said planet gears for the purposes of power transmission. The internal gear of the planetary gear set is furthermore preferably connectable, or rotationally conjointly connected, to the rotor of the further drive machine for the purposes of power transmission. By way of such a design of the planetary gear set in particular, a particularly space-saving construction of the drive machine coupling apparatus can be realized.

In a preferred embodiment, the internal gear of said planetary gear set is arranged radially at least in sections, preferably entirely, within the rotor of the further drive machine. It is preferable for at least that toothing of the internal gear which is provided for power transmission to be arranged at least in sections or entirely within said motor in an axial direction. In particular by way of the structural arrangement of the internal gear within the rotor of the further drive machine, a particularly space-saving construction of the drive machine coupling apparatus can be achieved.

In a preferred embodiment of the invention, the first coupling device is formed as a multiplate clutch, in particular a dry-running multiplate clutch. Said multiplate clutch preferably has a multiplate-clutch spring, and said multiplate-clutch spring is furthermore preferably arranged such that the multiplate clutch is preloaded into an opened position by the multiplate-clutch spring. Such clutches are known from the prior art, and are commonly referred to as "normally open" clutches.

Said multiplate clutch preferably has a first clutch actuator. Said first clutch actuator is furthermore preferably provided, for actuating said multiplate clutch, to impart a multiplate clutch force which is directed counter to the preload force that can be imparted by the multiplate-clutch spring, and in particular, said clutch actuator is thus designed to transfer the multiplate clutch from the opened position into a closed position. Here, in the opened position, no torque can be transmitted by the multiplate clutch, and in the closed position, a torque can be transmitted by the multiplate clutch.

In a preferred embodiment of the invention, the further coupling device is formed as a switchable, positively locking coupling device. Here, in the context of the invention, a positively locking coupling device is a coupling device in the case of which the selectively transmissible torque is transmissible by way of a positively locking connection, and in the open state of said coupling device, said positively locking connection is eliminated. Such positively locking coupling devices are known from the prior art in particular as dog clutches or in other structural forms.

In a preferred embodiment of the invention, the further coupling device is formed as a dog clutch. Said dog clutch preferably has a dog-clutch spring by way of which the dog clutch can be preloaded into an opened position, that is to say into an opened position in which the selectively transmissible torque cannot be transmitted. It is furthermore preferable for a further clutch actuator to be provided for actuating the further coupling device. Said further clutch actuator is preferably formed as a hydraulic actuator, preferably as an electric or magnetic actuator, and said actuator is particularly preferably formed as a hydraulic cylinder, and very particularly preferably as a hydraulic ring-shaped cylinder. It is furthermore preferable by way of said further clutch actuator for a force to be imparted to the further coupling device, which force is directed counter to the spring force of the dog-clutch spring and by way of which force the dog clutch can be transferred from its opened position into its closed position, in which a torque can be transmitted.

In a preferred embodiment, the coupling device and the further coupling device are arranged such that the dog-clutch force and the multiplate-clutch force, that is to say in each case the forces provided for transferring the coupling devices into their closed position, are directed oppositely. By way of such an arrangement of the coupling devices in particular, a particularly space-saving construction of these is made possible.

In a preferred embodiment, the input shaft and the output shaft of the drive machine coupling device are oriented concentrically with respect to one another, such that these are rotatable about a common axis of rotation. In an axial direction, along the axis of rotation, the coupling device and the further coupling device are preferably arranged spaced apart from one another. Here, an axial spacing is to be understood in this context to mean that the regions provided for the selective torque transmission, that is to say in particular the friction plates in the case of a multiplate clutch and in particular the dogs, which engage into one another, in the case of a dog clutch, do not overlap in an axial direction. It is furthermore preferable for the coupling devices to be arranged such that the clutch actuators do not overlap in an axial direction. In particular, by way of such a construction of the drive machine coupling apparatus, a particularly operationally reliable construction thereof is made possible.

The further coupling device, which is preferably formed as a positively locking coupling device, is preferably arranged geometrically in a region of the rotor which can be supplied with cooling lubricant, preferably with transmission oil. In particular by way of the cooling lubricant, the functional reliability of the further coupling device can be improved, and furthermore, said cooling lubricant can also be supplied to the gear set device, preferably to the planetary gear set. Furthermore, it is made possible by way of the cooling lubricant for waste heat, which is generated in particular when drive is provided by way of the further drive machine, to be dissipated.

A hybrid drivetrain according to the invention has a drive machine coupling apparatus of the type described above. As a first drive machine, a drivetrain of said type preferably has an internal combustion engine of reciprocating-piston type of construction. Furthermore, said hybrid drivetrain has a rotary vibration reduction system. Such systems are known from the prior art in different embodiments. Owing to the operating principle, the internal combustion engine outputs the drive torque to the drive machine coupling apparatus with torque non-uniformities; here, the rotary vibration reduction system is provided for at least reducing said torque non-uniformities. Said system is preferably arranged, in relation to the torque transmission, between the internal combustion engine and the drive machine coupling apparatus. The rotary vibration reduction system is preferably connectable, and preferably permanently rotationally conjointly connected, at one side to the internal combustion engine and at the other side to the drive machine coupling apparatus. The rotary vibration reduction system is preferably connectable at one side to the crankshaft of the internal combustion engine and at the other side to the input shaft of the drive machine coupling apparatus. By way of such a drive architecture in particular, a particularly efficient drive system can be realized.

In a preferred embodiment, the rotary vibration reduction system is selected from a group which comprises at least the following devices:
 centrifugal pendulum,
 single-mass flywheel,
 dual-mass or multi-mass flywheel,
 electric vibration damper, and/or
 hydraulic vibration damper.

Here, in this context, electric vibration damper is preferably to be understood to mean devices which can be operated in motor and generator modes. Furthermore, such dampers are preferably devices in which electrical power is depleted by way of a resistance circuit. Tests have shown that the stated rotary vibration reduction systems are particularly suitable for realizing a drivetrain according to the invention.

In a preferred embodiment, the first coupling device is connected axially fixedly to the second coupling device. The input side of the first coupling device is preferably formed as a clutch cage, and said clutch cage is connected rotationally conjointly and axially fixedly to the input side of the second coupling device. The rotary vibration reduction system can furthermore preferably be mounted, by way of at least one or more radial bearings, rotatably relative to or on the output shaft. The output side of the rotary vibration reduction system can furthermore preferably be mounted on the input side of the rotary vibration reduction system or vice versa. In particular, the input side of the rotary vibration reduction system is couplable to a crankshaft of an internal combustion engine, and the output side of said system is designed for outputting the power received from the internal combustion engine.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
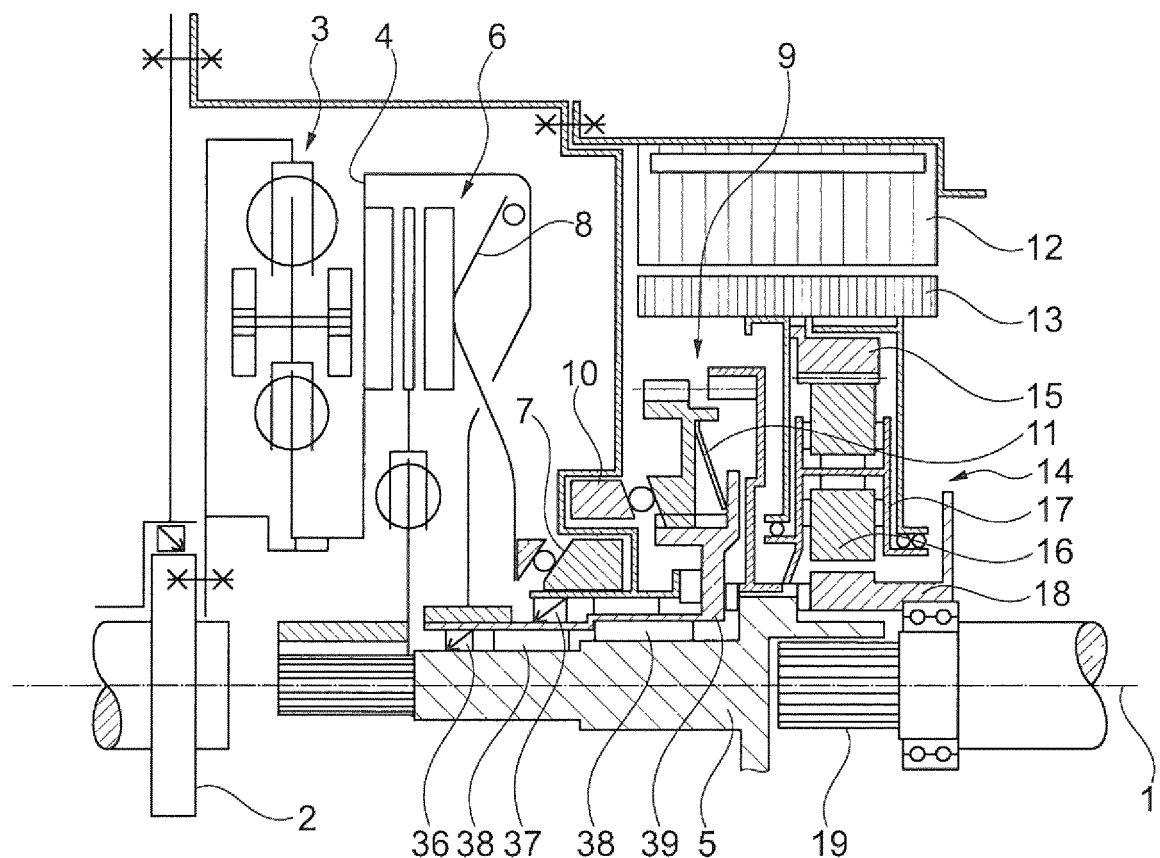
FIG. 1 is a partial longitudinal sectional illustration of the drive machine coupling apparatus.

FIG. 1 shows a longitudinal sectional illustration of the drive machine coupling apparatus. Here, it can be seen that the drive machine coupling apparatus is arranged substantially rotationally symmetrically with respect to the axis of rotation 1. The crankshaft 2 of the internal combustion engine (not illustrated) can output drive power for driving the motor vehicle to the input shaft 4. In the torque transmission direction from the internal combustion engine to the drive machine coupling apparatus, a rotary vibration reduction system 3 is arranged upstream of said drive machine coupling apparatus. Said rotary vibration reduction system has a centrifugal pendulum by way of which torque non-uniformity is our reduced in a manner dependent on the rotational speed that can be output by the internal combustion engine. In the same direction, a multiplate clutch 6 is arranged downstream of said rotary vibration reduction system and thus between the input shaft 4 and the output shaft 5, by way of which multiplate clutch said two shafts are selectively connectable to one another.

The multiplate clutch 6 can be actuated by way of a central multiplate-clutch actuator, which is formed as a hydraulic cylinder 7 with ring-shaped piston, or as a hydraulic central disengagement mechanism. The multiplate clutch 6 is actuable by way of the actuation 8, which is formed as a slotted diaphragm spring, and said multiplate clutch, when not actuated by the multiplate-clutch actuator, is situated in an opened position, in which no torque can be transmitted by the multiplate clutch 6 from the input shaft 4 to the output shaft 5.

The input shaft 4 is formed in sections as a hollow shaft and is thus connected directly to the further coupling device, which is formed as a dog clutch 9. Thus, by way of the dog clutch 9, the input shaft 4 is selectively connectable to the output shaft 5 for torque transmission, independently of the multiplate clutch 6. Both clutches 6, 9 are connected in parallel with respect to the transmission of torque, such that a greater torque is transmissible between the input shaft 4 and the output shaft 5 if both clutches 8, 9 are closed. The carrier 39 of the dog clutch 9 is rotatably mounted on the output shaft 5 by way of the radial bearing arrangement 38, and furthermore, said carrier 39 is connected rotationally conjointly to the multiplate clutch 6 by way of a shaft-hub connection.

The dog clutch 9 is actuable by way of a dog-clutch actuator, which is formed as a further hydraulic cylinder 10. Furthermore, the dog clutch 9 is preloaded by way of the dog-clutch spring 11 into the opened position, and is thus formed as a so-called "normally open" clutch, like the multiplate clutch 6.

Furthermore, the coupling apparatus has an electromechanical energy converter, that is to say an electric motor which is operable both in motor mode and in generator mode, having a stator 12, which is installed so as to be fixed with respect to a housing, and having a rotor 13 which is mounted so as to be rotatable relative to said stator 12. The rotor 13 is furthermore connected to the internal gear 15 of a planetary gear set 14. The planetary gear set 14 has multiple planet gears 16, which are mounted on the planet gear carrier 17. The planet gear carrier 17 is connected rotationally conjointly to the output shaft 5, and the planetary gear set 14 is thus designed so as to have a step-down transmission ratio from the rotor 13 to the output shaft 5 of 1.6.

The planet gears 16 mesh, for power transmission, both with the internal gear 15 and with the sun gear 18. The sun gear 18 is mounted fixedly with respect to a housing, that is to say permanently has a rotational speed of zero. The output shaft 5 of the drive machine coupling apparatus is connectable rotationally conjointly to a transmission input shaft 19 into a shiftable transmission (not illustrated).

Furthermore, radial shaft sealing rings 36, 37 are provided. Said radial shaft sealing rings 36, 37 prevent transmission oil, by way of which the electric motor 12, 13 can be cooled and by way of which the dog clutch 9 and the planetary gear set 14 are lubricated, from passing through to the dry multiplate clutch 6 and contaminating the latter. Thus, by way of the radial shaft sealing rings 36, 37, the oil chamber of the transmission is closed off in fluid-tight fashion with respect to the space in which the multiplate clutch 6 is arranged.

Figure 2:
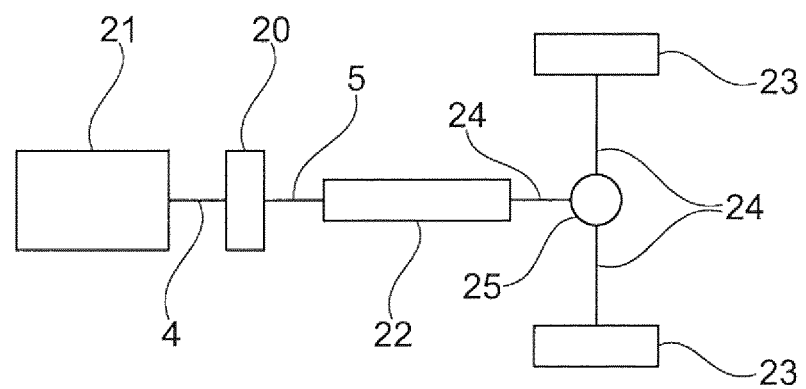
FIG. 2 is a view of a schematic hybrid drivetrain with a drive machine coupling apparatus of said type.

FIG. 2 shows a schematic drivetrain having a drive machine coupling apparatus as illustrated in FIG. 1. The drive machine coupling apparatus 20 is connectable at one side, by way of its input shaft 4, to the internal combustion engine 21, and that the other side, by way of its output shaft 5, to the transmission input shaft 19 into the shiftable transmission 22.

The drive power provided by the internal combustion engine 21 and/or by the electromechanical energy converter (not illustrated) is transmitted by the shiftable transmission 22 in the direction of the driveable wheels 23 by way of articulated shafts 24 and an axle transmission 25.

Here, in this drive configuration, it is made possible in particular to realize a particularly compact construction.

Figure 3:
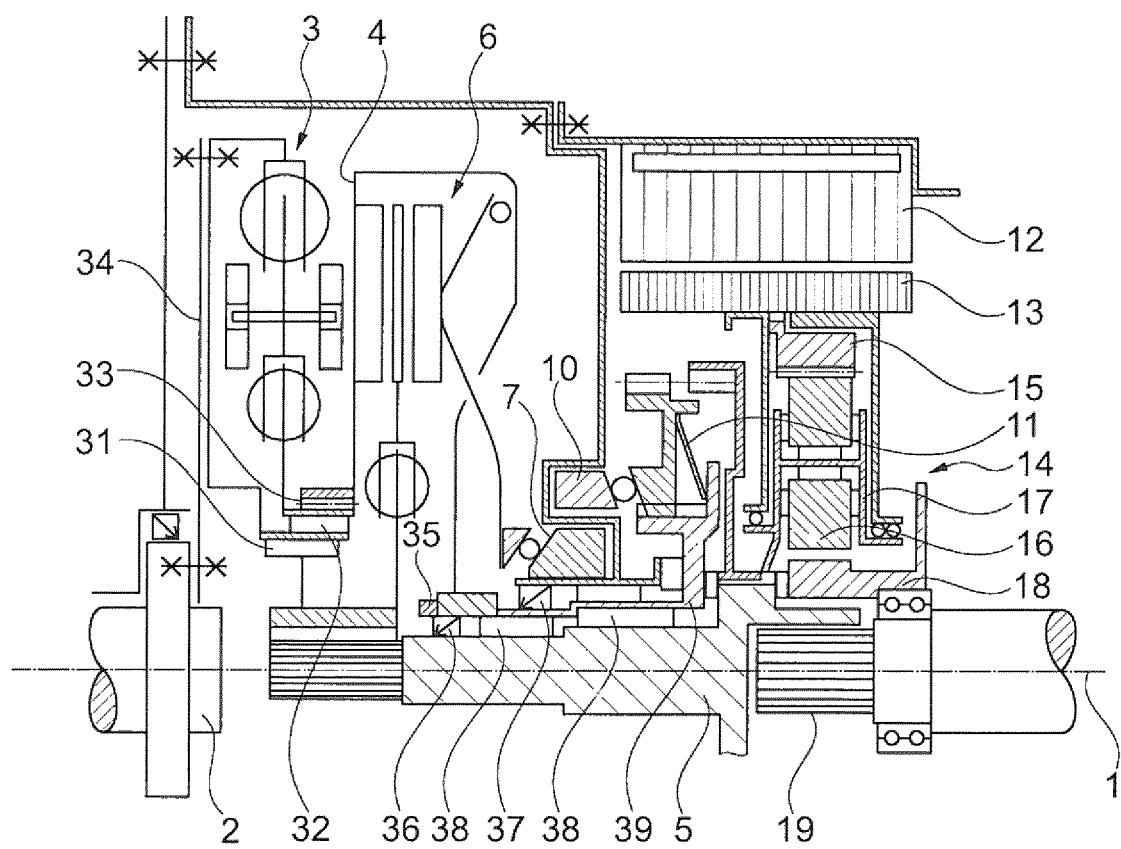
FIG. 3 is a view of a partial longitudinal sectional illustration of the drive machine coupling apparatus.

FIG. 3 shows a further embodiment with a preferred embodiment of the bearing arrangement of the first coupling device, multiplate clutch 6. Below, substantially the differences between the embodiments in FIG. 1 and FIG. 3 will be discussed.

The input shaft 4 is formed as a clutch cage of the multiplate clutch 6. Said clutch cage is, by way of a shaft-hub connection, connected rotationally conjointly to the carrier 39 of the dog clutch 9. Furthermore, said shaft-hub connection has an axial securing device 35, which may be formed for example as a shaft nut or as a securing ring. The multiplate clutch 6 is connected axially fixedly to the carrier 39 of the dog clutch 9 using the axial securing device 35.

The rotary vibration reduction system 3 is mounted rotatably relative to the output shaft 5 by way of the bearings 31 and 32, wherein the radial bearing 31 is provided for the input side of the rotary vibration reduction system 3, and the radial bearing 32 is provided for the output side thereof.

Furthermore, the rotary vibration reduction system 3 is connected rotationally conjointly to the crankshaft 2 by way of an axially flexible plate, a so-called flex plate 34. The flex plate 34 is of axially flexible, but torsionally rigid form.

By way of such an embodiment of the invention, it can be achieved that no forces from the clutch actuation are transmitted to the crankshaft 2 of the internal combustion engine.

By contrast to the embodiments of the invention illustrated in FIGS. 1 and 3, it is made possible for the transmission input shaft 19 and the output shaft 5 to be formed integrally with one another. In such a case, the planet gear carrier 17 is connected by way of a shaft-hub connection to the output shaft 5, such that the drive machine coupling apparatus can be assembled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive machine coupling apparatus for a motor vehicle with a hybrid drive, comprising:
    an input shaft, which is configured to receive drive power provided by a first drive machine;
    an output shaft, which is configured to output the drive power; and
    a first coupling device having a first coupling input side fixedly coupled for co-rotation with the input shaft, the first coupling device, in the direction of torque transmission from the input shaft to the output shaft, is arranged between the input and output shafts and by which torque can be selectively transmitted from the input shaft to the output shaft, the first coupling device being couplable by a first coupling output side directly to the output shaft, wherein in relation to the torque transmission from the input shaft to the output shaft, a second coupling device having a second coupling input side fixedly coupled for co-rotation with the input shaft, the second coupling device being arranged between the input and output shafts having a second coupling output side which is directly coupled to the output shaft, by way of the second coupling device, torque is selectively transmittable from the input shaft to the output shaft, and the second coupling device is, in relation to the torque transmission, arranged in parallel with respect to the first coupling device;
    wherein the output shaft is couplable to a second drive machine, and the second drive machine is formed as an electric drive machine with a rotor and a stator; and
    wherein a planetary gear set is arranged in the direction of the torque transmission from the second drive machine to the output shaft, the planetary gear set has a planet gear carrier which is couplable to the output shaft, on the planet gear carrier, there is rotatably mounted at least one planet gear with which, for power transmission,
    an internal gear or a sun gear of the planetary gear set, or both, are placeable in contact, and the internal gear is connectable, for power transmission, to the rotor.

2. The drive machine coupling apparatus according to claim 1, wherein the first coupling device is formed as a frictionally locking, selectively switchable multiplate clutch.

3. The drive machine coupling apparatus according to claim 1, wherein
    the second coupling device is formed as a positively locking, selectively switchable coupling device, such that torque is selectively transmittable from the input shaft to the output shaft by way of a positively locking connection.

4. The drive machine coupling apparatus according to claim 3, wherein the internal gear is arranged radially within the rotor, and at least toothing of the internal gear which is provided for power transmission is arranged at least in sections or entirely within the rotor in an axial direction.

5. The drive machine coupling apparatus according to claim 3, wherein the internal gear is arranged radially within the rotor, and at least toothing of the internal gear which is provided for power transmission is arranged at least in sections or entirely within the rotor in an axial direction.

6. The drive machine coupling apparatus according to claim 1, wherein
    the first coupling device is formed as a multiplate clutch,
    the multiplate clutch is actuable by an actuating arm and is formed as a normally open clutch, and
    a first clutch actuator is provided, by way of which a multiplate-clutch force is impartable for transferring the multiplate clutch into a closed position.

7. The drive machine coupling apparatus according to claim 1, wherein the second coupling device is formed as a normally open clutch.

8. The drive machine coupling apparatus according to claim 1, wherein
    the second coupling device is formed as a dog clutch,
    the dog clutch is preloaded into an opened position by way of a dog-clutch spring, and
    a second clutch actuator is provided, by way of which a dog-clutch force is impartable counter to the dog-clutch spring in order to transfer the dog clutch into a closed position.

9. The drive machine coupling apparatus according to claim 7, wherein
    the second coupling device is formed as a dog clutch,
    the dog clutch is preloaded into an opened position by way of a dog-clutch spring, and
    a second clutch actuator is provided, by way of which a dog-clutch force is impartable counter to the dog-clutch spring in order to transfer the dog clutch into a closed position.

10. The drive machine coupling apparatus according to claim 6, wherein the dog-clutch force and the multiplate-clutch force are directed counter to one another.

11. The drive machine coupling apparatus according to claim 8, wherein the dog-clutch force and the multiplate-clutch force are directed counter to one another.

12. The drive machine coupling apparatus according to claim 1, wherein
    the input shaft and the output shaft are arranged concentrically with respect to one another and are thus rotatable about a common axis of rotation, and
    the first coupling device and the second coupling device are arranged so as to be axially spaced apart from one another in an axial direction of the axis of rotation.

13. The drive machine coupling apparatus according to claim 3, wherein
    the input shaft and the output shaft are arranged concentrically with respect to one another and are thus rotatable about a common axis of rotation, and
    the first coupling device and the second coupling device are arranged so as to be axially spaced apart from one another in an axial direction of the axis of rotation.

14. A hybrid drivetrain for a motor vehicle, comprising:
    a drive machine coupling apparatus according to claim 1;

an internal combustion engine as a first drive machine; and a rotary vibration reduction system which, in relation to the transmission of torque, is arranged between the internal combustion engine and the input shaft.

15. The hybrid drivetrain according to claim 14, wherein the rotary vibration reduction system includes one or more devices from the following group of devices:
centrifugal pendulum,
single-mass flywheel,
dual-mass or multi-mass flywheel,
electric vibration damper,
hydraulic vibration damper.

16. A motor vehicle, comprising:
the hybrid drivetrain according to claim 14.

* * * * *